(12) United States Patent
Scharrer et al.

(10) Patent No.: US 7,718,951 B2
(45) Date of Patent: May 18, 2010

(54) ENCODER ARRANGEMENT ON A DIRECT CURRENT MOTOR

(75) Inventors: Manfred Scharrer, Nuremberg (DE); Todd Wooten, Holly Springs, NC (US)

(73) Assignee: Buehler Motor GmbH, Nurnberg (DE)

( * ) Notice: Subject to any disclaimer, the term of this patent is extended or adjusted under 35 U.S.C. 154(b) by 134 days.

(21) Appl. No.: 12/076,947

(22) Filed: Mar. 25, 2008

(65) Prior Publication Data
US 2008/0238267 A1    Oct. 2, 2008

(30) Foreign Application Priority Data
Mar. 28, 2007    (DE) .................. 10 2007 014 781

(51) Int. Cl.
*G01D 5/34* (2006.01)
(52) U.S. Cl. .................. 250/231.13; 250/239
(58) Field of Classification Search ................. 250/231.13–231.18, 239
See application file for complete search history.

(56) References Cited
U.S. PATENT DOCUMENTS

| | | | |
|---|---|---|---|
| 5,859,425 A | 1/1999 | Mleinek et al. | |
| 6,624,407 B1 * | 9/2003 | Aboonasry et al. | 250/231.14 |
| 6,960,758 B2 | 11/2005 | Tenca et al. | |
| 7,363,826 B2 * | 4/2008 | Sano | 73/862.328 |
| 7,501,614 B2 * | 3/2009 | Braun | 250/231.13 |

FOREIGN PATENT DOCUMENTS

DE    3010049 A1    9/1981

* cited by examiner

*Primary Examiner*—Thanh X Luu
*Assistant Examiner*—Tony Ko
(74) *Attorney, Agent, or Firm*—Jacobson Holman PLLC

(57) ABSTRACT

An encoder arrangement of a direct current motor, having an encoder housing, an encoder disk, a circuit board arranged perpendicular in reference to an motor shaft with an optic sensor encompassing the encoder disk in a U-shaped manner, and a connection plug aligned parallel to the motor shaft. The encoder arrangement allows a simple, economical, reliable, and precise assembly, requiring little construction space, and protecting the encoder arrangement from contaminations. The circuit board is provided with accepting slots for connectors, with contact surfaces of the circuit board being arranged partially around the accepting slots and an electric contact is made between the connectors and the contract surfaces. The encoder housing comprises an encoder housing ring and an encoder housing lid. The encoder housing ring is provided with a radial recess, which is arranged in the area of the connector plug. The optical sensor is arranged on the circuit board at the side of the connector plug, and is provided with an accepting slot for the encoder disk, which accepting slot being open towards the motor shaft on which the encoder disk is mounted. The accepting slots are open on the side of the direct current motor opposite the connection plug and towards the edge of the circuit board.

14 Claims, 3 Drawing Sheets

ENCODER ARRANGEMENT ON A DIRECT CURRENT MOTOR

CROSS-REFERENCE TO RELATED APPLICATIONS

Not applicable.

BACKGROUND OF THE INVENTION (1) Field of the Invention

The invention relates to an encoder arrangement on a direct current motor, and more particularly to an encoder arrangement having an encoder housing, an encoder disk, a circuit board arranged perpendicular in reference to a motor shaft with an optic sensor encompassing the encoder disk in a U-shaped manner, and a connector plug aligned parallel in reference to the motor shaft.

(2) Description of Related Art Including Information Disclosed Under 37 CFR 1.97 and 1.98

A generic encoder arrangement is known from U.S. Pat. No. 5,859,425. In the known arrangement, the encoder disk must be assembled blindly, which can lead to assembly errors. Additionally, guidance devices requiring expensive additional construction space are needed to facilitate the assembly process. Further, a safety element is necessary to prevent the loss of the encoder disk by the encoder disk falling out. This increases expenses for both parts and assembly.

BRIEF SUMMARY OF THE INVENTION

Therefore, an object of the invention is to provide an encoder arrangement allowing a simple, economical, reliable, and precise assembly, requiring as little construction space as possible, and protecting the encoder arrangement from contamination very well. This object is attained in the construction of the preferred embodiment. A radial assembly is possible through the use of an open accepting slots for connectors in a circuit board. The same applies to the arrangement and the alignment of an optic sensor. The encoder disk can be pulled directly onto a motor shaft; thus, a safety element to prevent the encoder disk from falling out can be omitted. The assembly of the encoder disk can be made more reliably because the respective assembly devices are accessible.

A reliable connection of the housing of the encoder to a direct current motor is allowed by the bottom of an encoder housing ring. The encoder disk is optimally protected inside the encoder housing and by the precise assembly it cannot come into contact with housing parts, the circuit board, or the optic sensor.

The circuit board is connected to plug pins, immediately serving as plug contacts, thus no additional components and no additional assembly steps are necessary. The plug-in process can be executed safely by the radially off-set arrangement of the plug area and accessibility is ensured. The circuit board contacts a contact surface of the encoder housing ring in the axial direction. This precisely determines its axial position in reference to the encoder disk. The same applies for the encoder housing lid, which further allows a simple assembly by its snapping means.

The electric connection between the direct current motor and the circuit board is created by the connectors accepted in the receivers of the encoder housing ring, which allow a secure fastening and a precise assembly of the circuit board. In order to ensure a precise assembly, connectors made of punched sheet metal are arranged such that a correlation is given to the alignment of the accepting slots of the circuit board.

The electric connections between the connectors and the contact areas are soldered connections and they are arranged on the side of the circuit board facing away from the encoder disk. Due to this geometric arrangement, contaminants naturally developing during the soldering process cannot reach the sensitive encoder disk.

A snapping latch at the plug housing serves to release tension. It must be particularly emphasized in this context that the forces in a power cable connected during the assembly and during operation influencing the tension release are directly transferred from the encoder housing lid to the encoder housing ring and not to the circuit board. This avoids stressing of soldering points on the circuit board.

The assembly of the individual parts of the encoder arrangement is performed in the following sequence:

a) axially screwing the encoder housing ring to the bearing bracket,
b) pulling the encoder disk onto the motor shaft,
c) radially assembling the circuit board in the encoder housing ring and inserting the accepting slots into the connectors and creating an electric connection, and
d) axially putting on the encoder housing lid and snapping it.

When the encoder housing ring is screwed together, the encoder disk cannot be damaged because it is assembled thereafter. The good accessibility of the parts during the assembly and their precise positioning are advantageous. The radial assembly is necessary because the optic sensor cannot be axially mounted for geometric reasons. When pulling the encoder disk onto the motor shaft the contact surface of the encoder housing ring serves as the stop for the mounting tool. This way, the axial position of the encoder disk can be adjusted to the same reference levels that determine the axial position of the circuit board.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
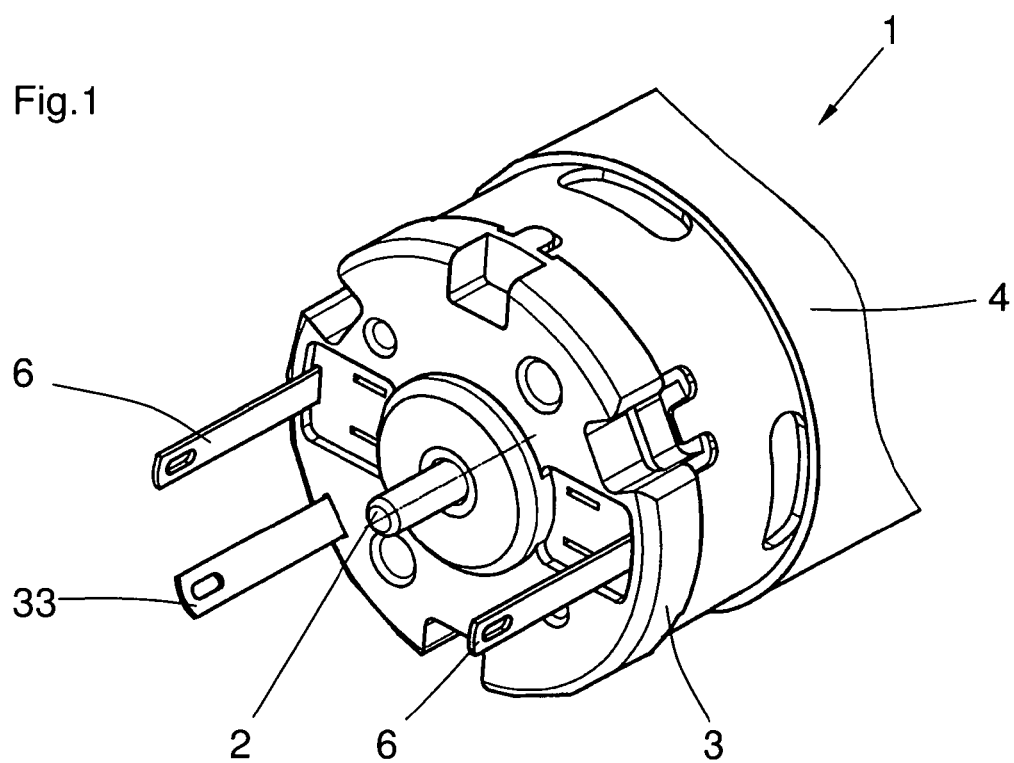
FIG. 1 shows a view of a direct current motor prior to the assembly of an encoder device.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a view of a direct current motor 1 prior to the assembly of an encoder device or arrangement 20. The motor 1 has a motor housing 4, a bearing bracket 3, a motor shaft 2, and connectors 6. The bearing bracket 3 is connected to the housing in a fixed manner and accepts a bearing to support the motor shaft 2. The motor shaft 2 protrudes axially from the motor housing. A ground contact 33 is embodied parallel in reference to the connectors 6 and electrically connected to the motor housing 4 (electric connection not shown).

Figure 2:
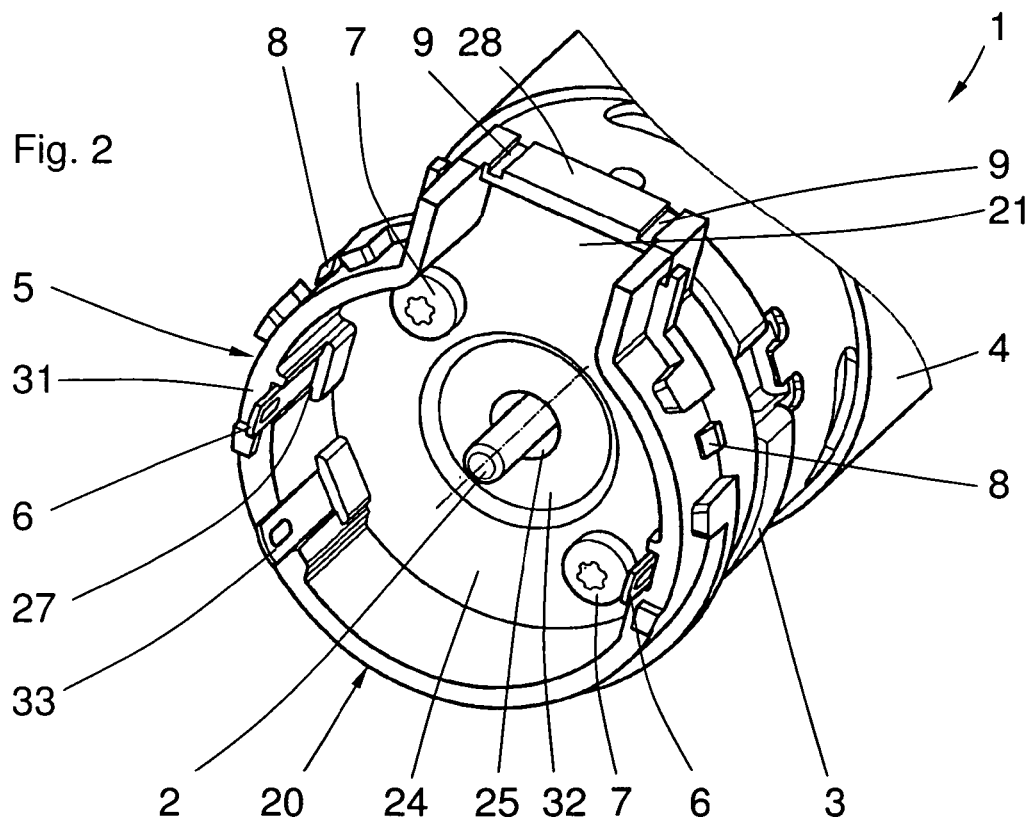
FIG. 2 shows a view of the direct current motor after the assembly of the encoder housing ring.

FIG. 2 shows a view of the direct current motor 1 after the assembly of an encoder housing ring 5, which is mounted to the bearing bracket via fastening screws 7, here with hex-head bolts. The connectors 6 are accepted in recesses 27 during the assembly and thus radially stabilized. The encoder housing ring 5 is provided with a bottom 24, in which a central opening 25 is located through which the motor shaft 2 protrudes into the space limited by the encoder housing ring 5 and which together with a bearing bracket attachment piece 32 serves as the centering means for the encoder housing ring 5. The bottom 24 also prevents dirt created by the motor brushes (not shown) from entering into the encoder housing chamber. The encoder housing ring 5 is of a generally circular shape, provided deviating from the basic shape radially with an expansion, in which a radial recess 21 is located. The radial recess 21 is axially limited by a connecting bar 28. The connecting bar is provided with guiding grooves 9 aligned parallel in reference to the motor shaft 2. Further, the encoder housing ring 5 is made in one piece with a snapping latch 8 at its outside, serving as a connection means.

Figure 3:
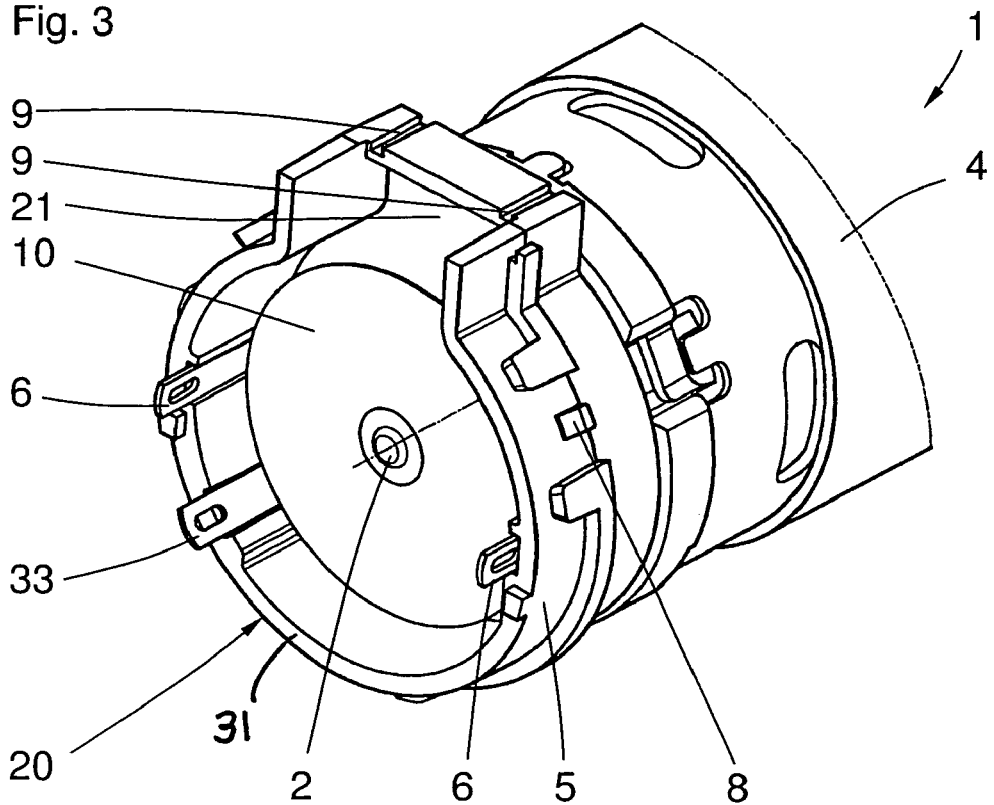
FIG. 3 shows a view of the direct current motor after the assembly of an encoder disk.

FIG. 3 shows a view of the direct current motor 1 after the assembly of the encoder disk 10. The motor shaft 2 protrudes from the motor housing 4 to such an extent only that the encoder disk 10 can be assembled without any problems. One face of the encoder housing ring 5 shows a contact surface 31, which, on the one hand, serves as the stop for a mounting tool to pull the encoder disk 10 onto the motor shaft 2 and, on the other hand, as a stop for the circuit board 11 carrying an optic sensor 12. This way, a very precise, correctly positioned assembly of the encoder disk is possible because all measurement tolerances influencing the relative axial position of the encoder disk in reference to the optic sensor are related to the contact surface 31.

Figure 4:
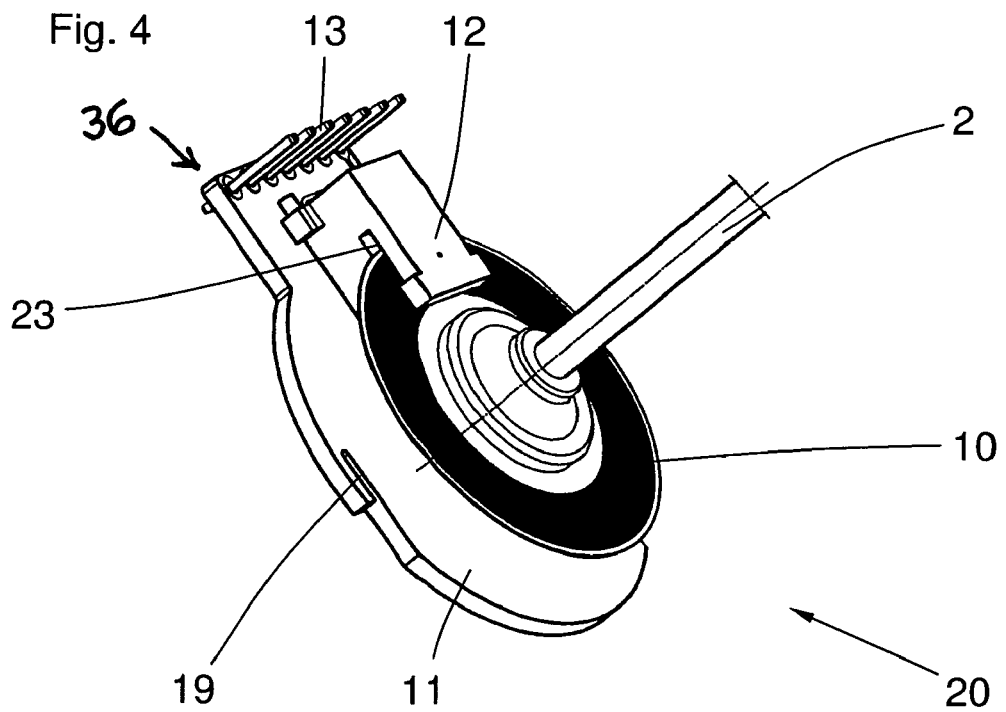
FIG. 4 shows an illustration of a circuit board with an optic sensor and an encoder disk.

FIG. 4 shows an illustration of the circuit board 11 with the optic sensor 12 and the encoder disk 10. The illustration serves only to illustrate the geometric configuration and the assembly direction of the circuit board. Actually, a pre-assembly component is not given in the combination shown. The optic sensor 12 encompasses the encoder disk 10 in a U-shaped manner and can therefore only be assembled radially. The optic sensor 12 is mounted on the circuit board 11 and electrically connected thereto. A multitude of contact pins 13 is impressed into the circuit board 11, which, on the one hand, serves for the energy supply of the direct current motor and, on the other hand, forwards control signals of the sensor. The circuit board 11 is provided with accepting slots 19, which are partially surrounded by contact surfaces 14 (see FIG. 5). The accepting slots 19 are open towards the edge of the circuit plate; they extend such that the radial assembly direction for the sensor 12 correlates to the assembly direction of the contact slots 19 into the connectors 6. The basic shape of the circuit board 11 is circular, similar to the encoder housing ring 5. Deviating from the basic shape, the circuit board is radially expanded in the area 36 of the plug contacts.

Figure 5:
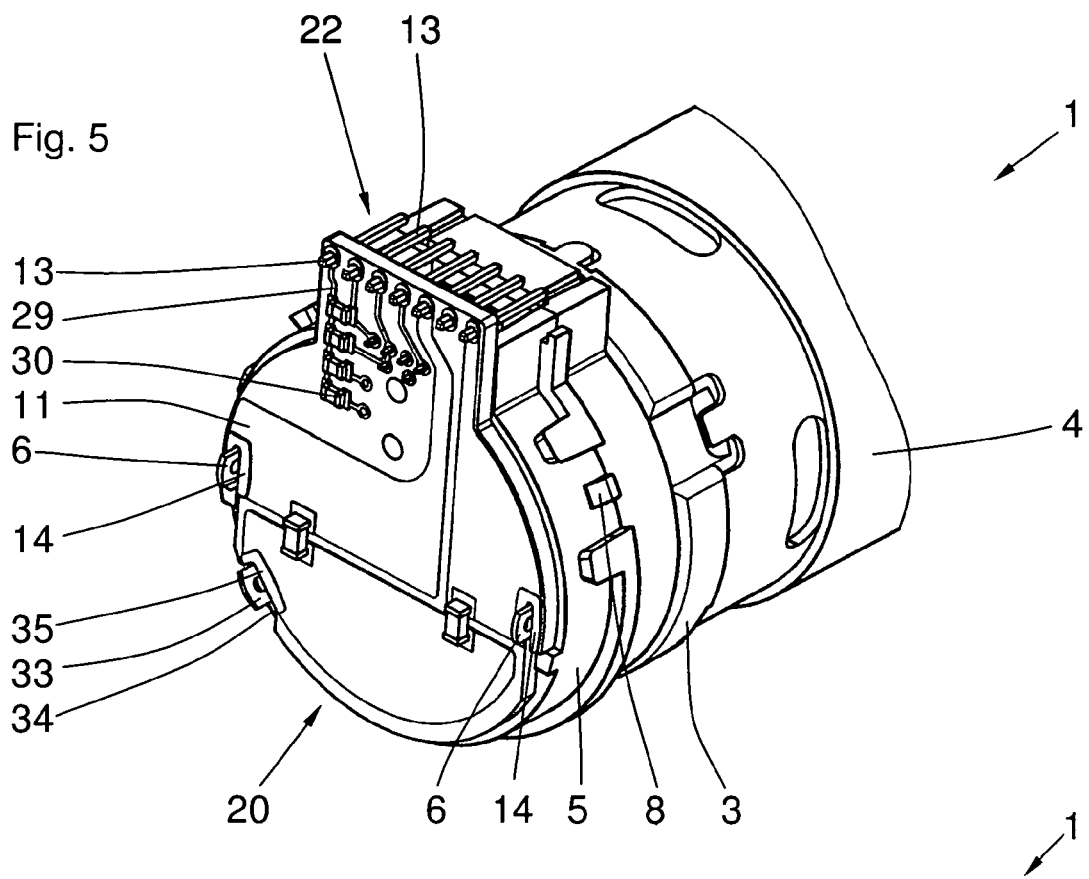
FIG. 5 shows a view of the direct current motor after the assembly of a circuit board.

FIG. 5 shows a view of the direct current motor 1 after the assembly of the circuit board 11. The circuit board is provided with the contact pins 13, conductors 29, and electronic components 30. The connectors 6 are soldered to the circuit board in the area of the contact surfaces 14. Based on the arrangement shown splashing solder cannot lead to any contamination of the encoder disk. The circuit board is provided with a recess 34 at the edge, with its limit being provided with a ground contact surface 35, electrically connected to the ground contact 33 by way of soldering.

Figure 6:
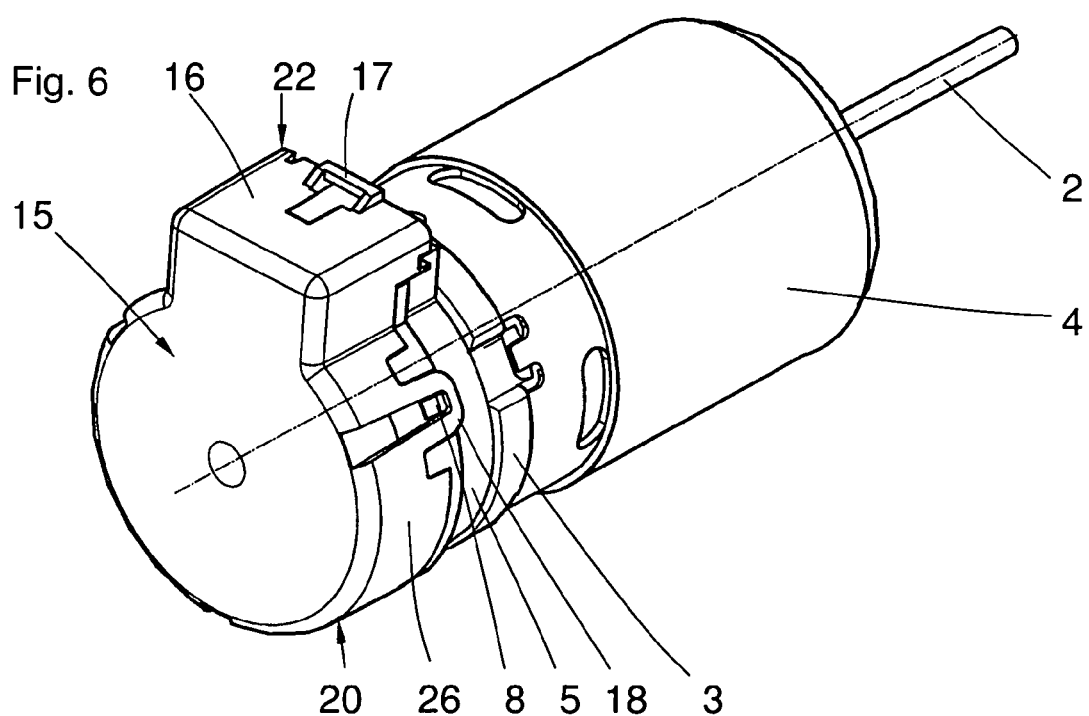
FIG. 6 shows a view of the direct current motor after the assembly of an encoder housing lid.

FIG. 6 shows a view of the direct current motor 1 after the assembly of an encoder housing lid 15, in one piece with the snapping eyelets 18, that enter into a form-fitting connection with the snapping latches 8 of the encoder housing ring 5. The encoder housing lid is of a generally circular shape. In the area of a connection plug 22 the encoder housing lid 15 is radially expanded and made in one piece with the plug housing 16. The plug housing 16 is provided with a snapping latch 17, which serves as a tension release means at the counter plug. The forces acting at a cable to be connected would not be transferred to the circuit board and its soldering sites, but to the encoder housing ring 5 via the snapping means 17, 8, 18.

A reliable connection of the housing 4 of the encoder 20 to a direct current motor 1 is allowed by the bottom 24 of the encoder housing ring 5. The encoder disk 10 is optimally protected inside the encoder housing and by the precise assembly it cannot come into contact with housing parts, the circuit board, or the optic sensor.

The circuit board 11 is connected to the plug pins, immediately serving as plug contacts 13, thus no additional components and no additional assembly steps are necessary for contacting. The plug-in process can be executed safely by the radially off-set arrangement of the plug area and accessibility is ensured.

The circuit board 11 contacts a contact surface 31 of the encoder housing ring 5 in the axial direction. This precisely determines its axial position in reference to the encoder disk 10. The same applies for the encoder housing lid 15, which further allows a simple assembly by its snapping means.

The electric connection between the direct current motor 1 and the circuit board 11 is created by the connectors 6 accepted in the receivers 27 of the encoder housing ring 5, which allow a secure fastening and a precise assembly of the circuit board 11. In order to ensure a precise assembly, connectors 6 made of punched sheet metal are arranged such that a correlation is made with the alignment of the accepting slots 19 of the circuit board 11.

It is provided for the electric connections between the connectors 6 and the contact areas 14 to be soldered connections and they are arranged on the side of the circuit board 11 facing away from the encoder disk 10. Due to this geometric arrangement, contaminants naturally developing during the soldering process cannot reach the sensitive encoder disk 10.

A snapping latch 17 at the plug housing serves to release tension. It must be particularly emphasized in this context that the forces in a power cable connected during the assembly and during operation influencing the tension release are directly transferred from the encoder housing lid 15 to the encoder housing ring 5 and not to the circuit board 11. This avoids stressing the soldering points on the circuit board.

The assembly of the individual parts of the encoder arrangement is performed in the following sequence:

a) axially screwing the encoder housing ring 5 to the bearing bracket 3, b) pulling the encoder disk 10 onto the motor shaft 2, c) radially assembling the circuit board 11 in the encoder housing ring and inserting the accepting slots 19 into the connectors 6 and creating an electric connection, and d) axially putting on the encoder housing lid and snapping it.

When the encoder housing ring is screwed together, the encoder disk 10 cannot be damaged because it is assembled thereafter. The easy accessibility of the parts during the assembly and their precise positioning are advantageous. The radial assembly is necessary because the optic sensor 12 cannot be axially mounted for geometric reasons.

When pulling the encoder disk 10 onto the motor shaft 2 the contact surface 31 of the encoder housing ring 5 serves as the stop for the mounting tool. This way, the axial position of the encoder disk can be adjusted to the same reference levels that determine the axial position of the circuit board 11.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE CHARACTERS

1 Direct current motor
2 Motor shaft
3 Bearing bracket
4 Housing
5 Encoder housing ring
6 Connector
7 Mounting screw
8 Snapping latch
9 Guidance groove
10 Encoder disk (timing disk)
11 Circuit board
12 Sensor
13 Contact pins
14 Contact surfaces
15 Encoder housing lid
16 Plug housing
17 Snapping latch
18 Snapping eyelet
19 Accepting slots
20 Encoder arrangement
21 Radial recess
22 Connector plug
23 Accepting slot
24 Bottom
25 Shaft opening
26 Circumferential edge
27 Receiver
28 Connecting bar
29 Conductor
30 Component
31 Contact surface
32 Bearing bracket attachment piece
33 Ground contact
34 Recess
35 Ground contact surface
36 Expanded area

What is claimed is:

1. An encoder for a direct current motor having a motor shaft, the encoder comprising:
   a. an encoder housing,
   b. an encoder disk,
   c. a circuit board arranged perpendicular to the motor shaft and having an optic sensor, the circuit board encompassing the encoder disk in a U-shaped manner, and
   d. a connector plug aligned parallel to the motor shaft, wherein the circuit board is provided with
      i. accepting slots for connectors,
      ii. contact surfaces of the circuit board being partially arranged around the accepting slots, and
      iii. an electric contact between the connectors and the contact surfaces such that the encoder housing has an encoder housing ring and an encoder housing lid and the encoder housing ring is provided with a radial recess, which is arranged in the area of the connector plug,
   e. the optic sensor being arranged on the circuit board at the side of the connector plug and provided with an accepting slot for the encoder disk, which accepting slot is open in the direction of the motor shaft, on which the encoder disk is mounted, and
   f. the accepting slots are open towards the side of the direct current motor opposite the connector plug and towards the edge of the circuit board.

2. The encoder arrangement according to claim 1 with the direct current motor having a bearing bracket, and wherein the encoder housing ring comprises:
   a bottom having a shaft opening, the bottom being axially screwed to the bearing bracket of the direct current motor.

3. The encoder arrangement according to claim 2, wherein the encoder disk is axially arranged between the bottom and the circuit board and radially inside the encoder housing ring, with the encoder disk being freely rotational relative to the encoder housing, the circuit board, and the optic sensor.

4. The encoder arrangement according to claim 1, further comprising:
   plug pins defined on the connector plug, and wherein the circuit board is of an essentially circular shape and is provided with a rectangular expanded section, in which the plug pins are mounted and aligned parallel in reference to the motor shaft.

5. The encoder arrangement according to claim 1, further comprising a contact surface defined on the encoder ring housing and wherein the circuit board contacts the contact surface in the axial direction.

6. The encoder arrangement according to claim 1, further comprising:
   a. a rectangular expanded section provided on the encoder housing lid which is of an essentially circular shape,
   b. a plug housing formed in the rectangular expanded section,
   c. a circumferential edge defined on the encoder housing lid,
   d. snapping latches defined on the encoder housing ring,
   e. snapping eyelets defined on the circumferential edge, the snapping eyelets engaging the snapping latches in a form-fitting manner.

7. The encoder arrangement according to claim 1 with the direct current motor having a bearing bracket, and wherein the connectors are accepted in the receivers of the encoder housing ring and create electric connections between the bearing bracket.

8. The encoder arrangement according to claim 1 with the direct current motor having a bearing bracket, and wherein the connectors are accepted in the receivers of the encoder housing ring and create electric connections between a brush yoke to the circuit board.

9. The encoder arrangement according to claim 1, wherein the connectors are made of punched sheet metal, aligned in the encoder housing ring such that the length of the sheet metal connectors arranged in the accepting slots coincide with the alignment of the accepting slots.

10. The encoder arrangement according to claim 1, wherein the electric connections between the connectors and the contact surfaces are soldered connections and that they are arranged at the side of the circuit board facing away from the encoder disk.

11. The encoder arrangement according to claim 1, further comprises at least one snapping latch wherein the plug housing and the at least one snapping latch are made in one piece.

12. A method for assembling an encoder arrangement according to claim 8, the method comprising the steps of:

b) axially screwing the encoder housing ring to the bearing bracket,
c) pulling the encoder disk onto the motor shaft,
d) radially assembling the pre-fabricated circuit board in the encoder housing ring, inserting the accepting slot into the connectors, and creating an electric connection and
e) axially putting on the encoder housing lid and snapping the encoder housing lid.

13. The method according to claim 11, wherein the electric connection between the contact surfaces in the area of the accepting slots and the connectors are made by way of soldering.

14. The method according to claim 11, wherein a mounting tool contacts a contact surface defined on the encoder housing ring during the mounting process of the encoder disk thus adjusting the mounting measure of the encoder disk on the motor shaft.

* * * * *